United States Patent [19]
Lee

[11] Patent Number: 5,345,503
[45] Date of Patent: Sep. 6, 1994

[54] METHOD FOR MANAGING AND RE-CONNECTING A SPEECH PATH LINK IN A SWITCHING NETWORK

[75] Inventor: Seong-Geun Lee, Kyungki-do, Rep. of Korea

[73] Assignee: SamSung Electronics Co., Ltd., Suwon, Rep. of Korea

[21] Appl. No.: 899,889

[22] Filed: Jun. 17, 1992

[30] Foreign Application Priority Data

Dec. 24, 1991 [KR] Rep. of Korea ............... 1991-24124

[51] Int. Cl.$^5$ ..................... H04M 3/08; H04M 3/12
[52] U.S. Cl. .................... 379/221; 379/220; 379/279; 379/32
[58] Field of Search ........... 379/221, 279, 32, 216, 379/220; 370/94.1

[56] References Cited

U.S. PATENT DOCUMENTS

| | | | |
|---|---|---|---|
| 4,905,233 | 2/1990 | Cain et al. | 370/94.1 |
| 5,018,187 | 5/1991 | Marinho et al. | 379/221 |
| 5,058,105 | 10/1991 | Mansour et al. | 370/16 |
| 5,146,452 | 9/1992 | Pekarske | 379/221 |
| 5,239,537 | 8/1992 | Sakauchi | 379/221 |

Primary Examiner—James L. Dwyer
Assistant Examiner—Daniel S. Hunter
Attorney, Agent, or Firm—Robert E. Bushnell

[57] ABSTRACT

A method for managing a speech path link in a switching system in case of a faulty link. When a message of "link establish" is received by the switching system, a routing table comprising a plurality of nodes interconnected by a plurality of links is renewed and a message of "new information" is transmitted to an adjacent node. When a message of "link cut off" is received, a routing table is renewed and a message of "new information" is transmitted to an adjacent node and a communicating subscriber using a disconnected link is searched for. If the subscriber is speaking on the telephone, a message of "path re-establish" is transmitted and if the subscriber is not speaking on the telephone, a message of "link cut off" is transmitted to the subscriber. When a message of "new information" is received, a routing table is renewed.

17 Claims, 8 Drawing Sheets

ROUTING TABLE

| NODE NO. | PREFERABLE LINK | | | WORST LINK |
|---|---|---|---|---|
| | FIRST LINK NO. | SECOND LINK NO. | · · · | Nth LINK NO. |
| | | | | |
| | | | | |
| | | | | |
| | | | | |

1

METHOD FOR MANAGING AND RE-CONNECTING A SPEECH PATH LINK IN A SWITCHING NETWORK

BACKGROUND OF THE INVENTION

The present invention relates to a call process of a subscriber through a corresponding link when a link connecting each node (hereinafter referred to as a trunk link) is cut off in a switching network.

Assuming that subscribers A and B are talking over the telephone through a node 3 as shown in FIG. 1, if a trunk link connecting the node 3 to a node 4 is cut off, then a message of "link cut off" is transmitted to the subscribers A and B and a telephone call is disconnected. In this case, the disconnection of the trunk link can be caused by excessive errors, excessive loss of a message by the increase of load, etc. as well as the disconnection of a line. However, in FIG. 1, since there are another paths, for example, such as a path through a node 5 capable of speaking on the telephone between the subscribers A and B, it is undesirable to cut off a telephone call. In other words, since a decentralized switching network has various paths for connecting a specific node to another, even if a link between specific nodes is disconnected, a telephone call is possible without disconnecting a call.

SUMMARY OF THE INVENTION

An object of the present invention to provide a call process method of a subscriber through a corresponding link when a trunk link is cut off, by re-establishing a call of the subscriber through a replaceable path.

In accordance with one aspect of the present invention, a method for managing a speech path link in a switching system, includes the steps of: renewing a routing table when a message of "link establish" is received; transmitting a message of "new information" to an adjacent node; renewing a routing table and transmitting a message of "new information" to an adjacent node when a message of "link cut off" is received, searching for a communicating subscriber through a corresponding link, transmitting a message of "path re-establish" when the subscriber is speaking on the telephone, and transmitting a message of "link cut off" to the subscriber when the subscriber is not speaking on the telephone; and renewing a routing table when a message of "new information" is received.

BRIEF DESCRIPTION OF THE DRAWINGS

For a better understanding of the invention and to show how the same may be carried into effect, reference will now be made, by way of example, to the accompanying drawings, in which.

DETAILED DESCRIPTION OF THE PREFERRED EMBODIMENT

Figure 2:
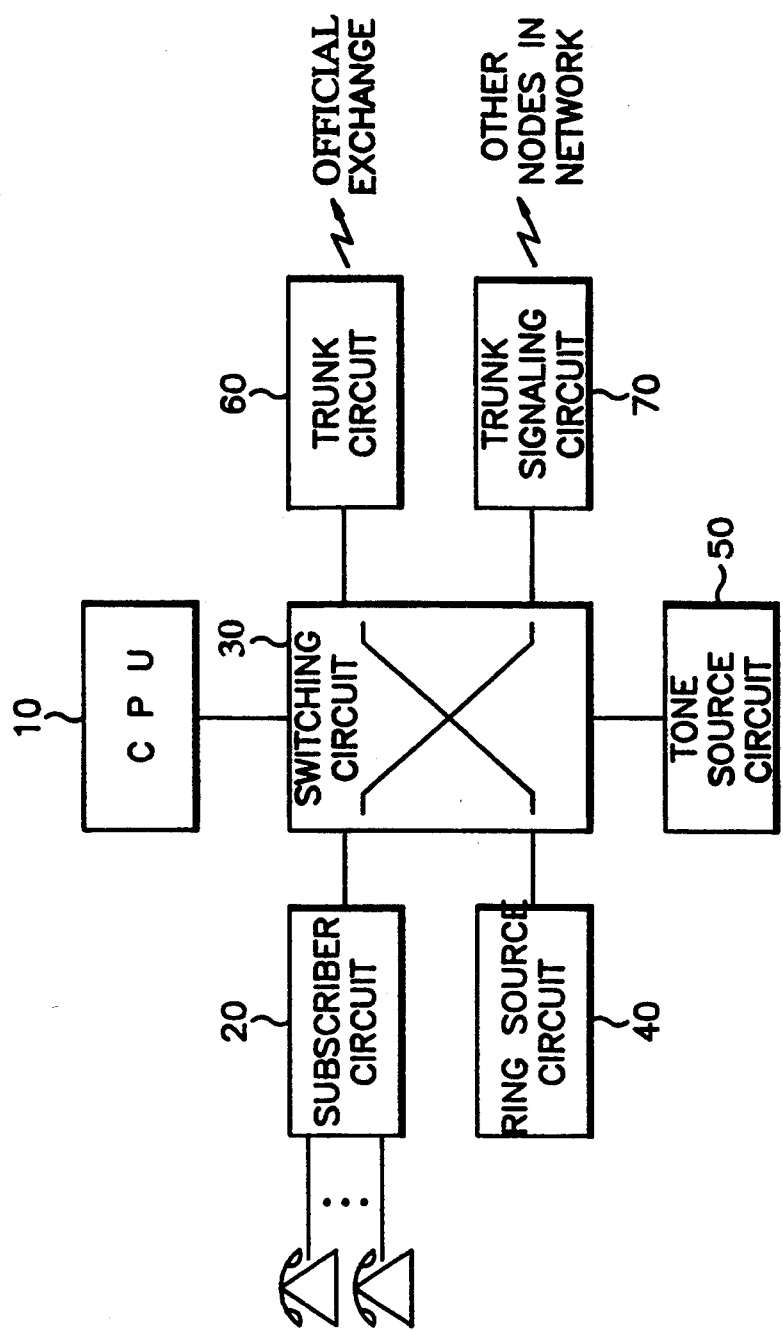
FIG. 2 is a block diagram of a switching system applied to the present invention.

Referring to FIG. 2, a central processing unit 10 controls a switching system and a subscriber circuit 20 interfaces an extension subscriber. A switching circuit 30 implements switching of aural and signaling information through extension and office line interface under the control of the central processing unit 10. Ring and tone source circuits 40 and 50 generate ring and tone signals respectively. A trunk circuit 60 is interfaced with an official exchange system, and a trunk signaling circuit 70 performs signaling with an adjacent node in a network.

Figures 1, 3:
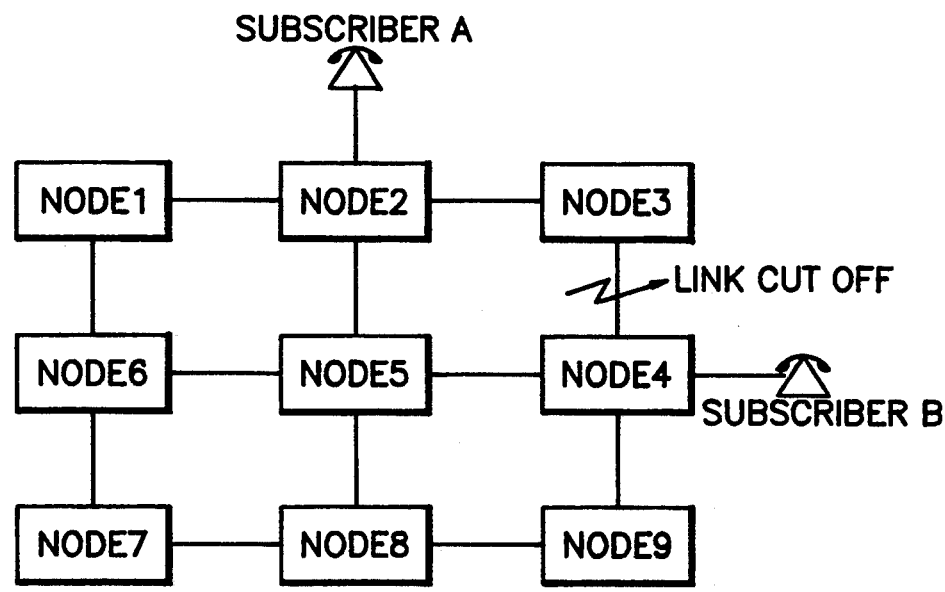
FIG. 1 is a diagram showing speech paths when subscribers are talking over the telephone.
FIG. 3 is a diagram showing a routing table applied to the present invention.

Referring to FIG. 3, a routing table includes links for proceeding to a specific node from the most preferable link to the worst link.

A link management program for managing a link state and the routing table, and a call process program for managing a call of a subscriber will now be described in conjunction with FIGS. 4 and 5A–5E. The programs refer to each other and exchange a message.

Figure 4:
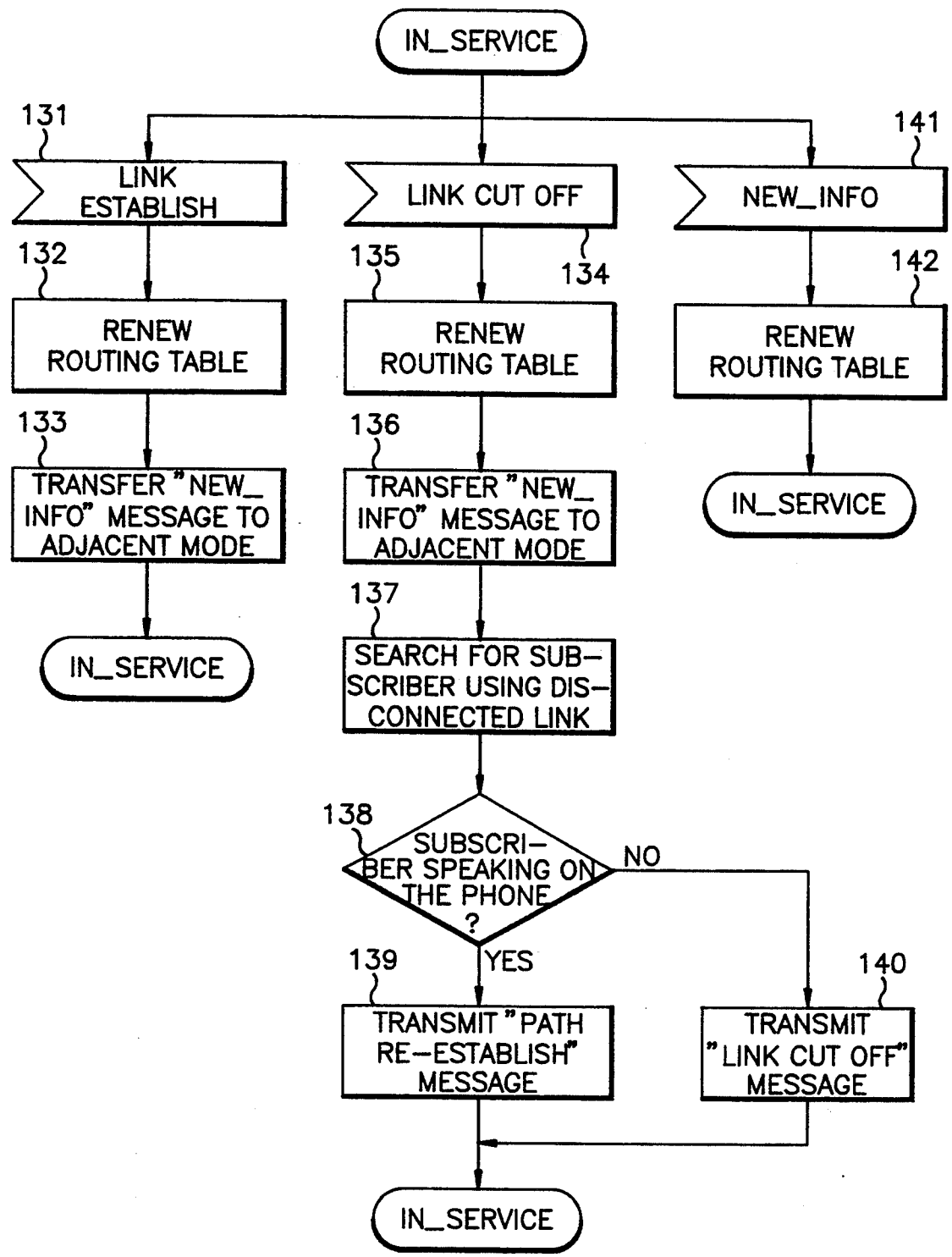
FIG. 4 is a flowchart showing a link management program according to the present invention.
Figure 5A:
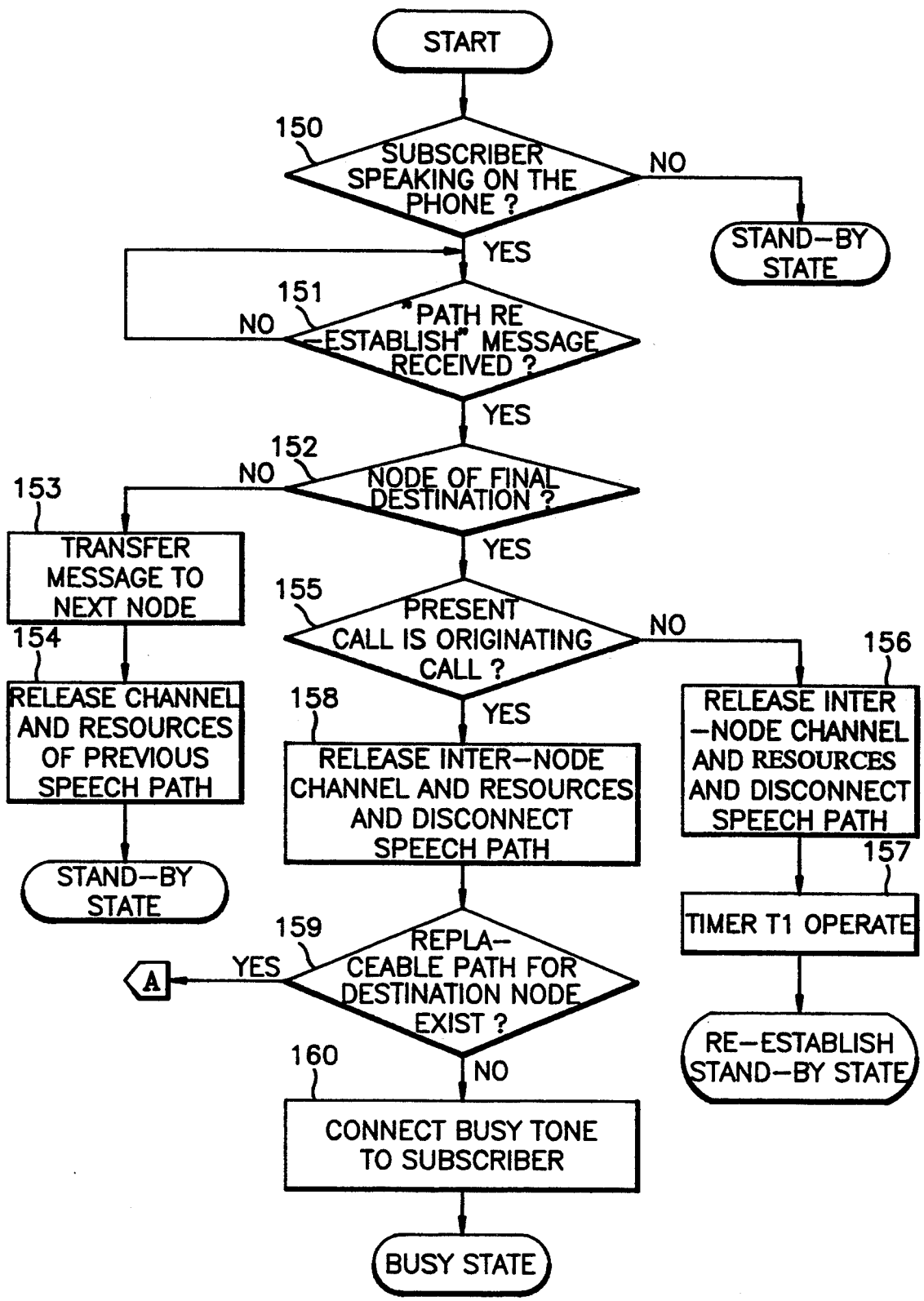
FIGS. 5A to 5E are flowcharts showing a call process program according to the present invention.
Figure 5B:
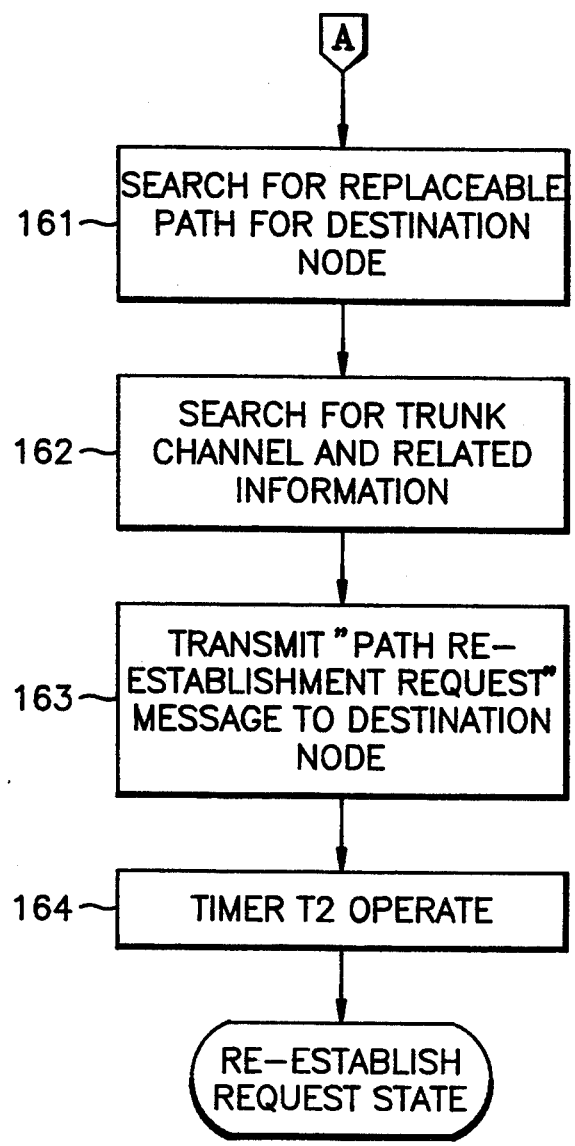
Figure 5C:
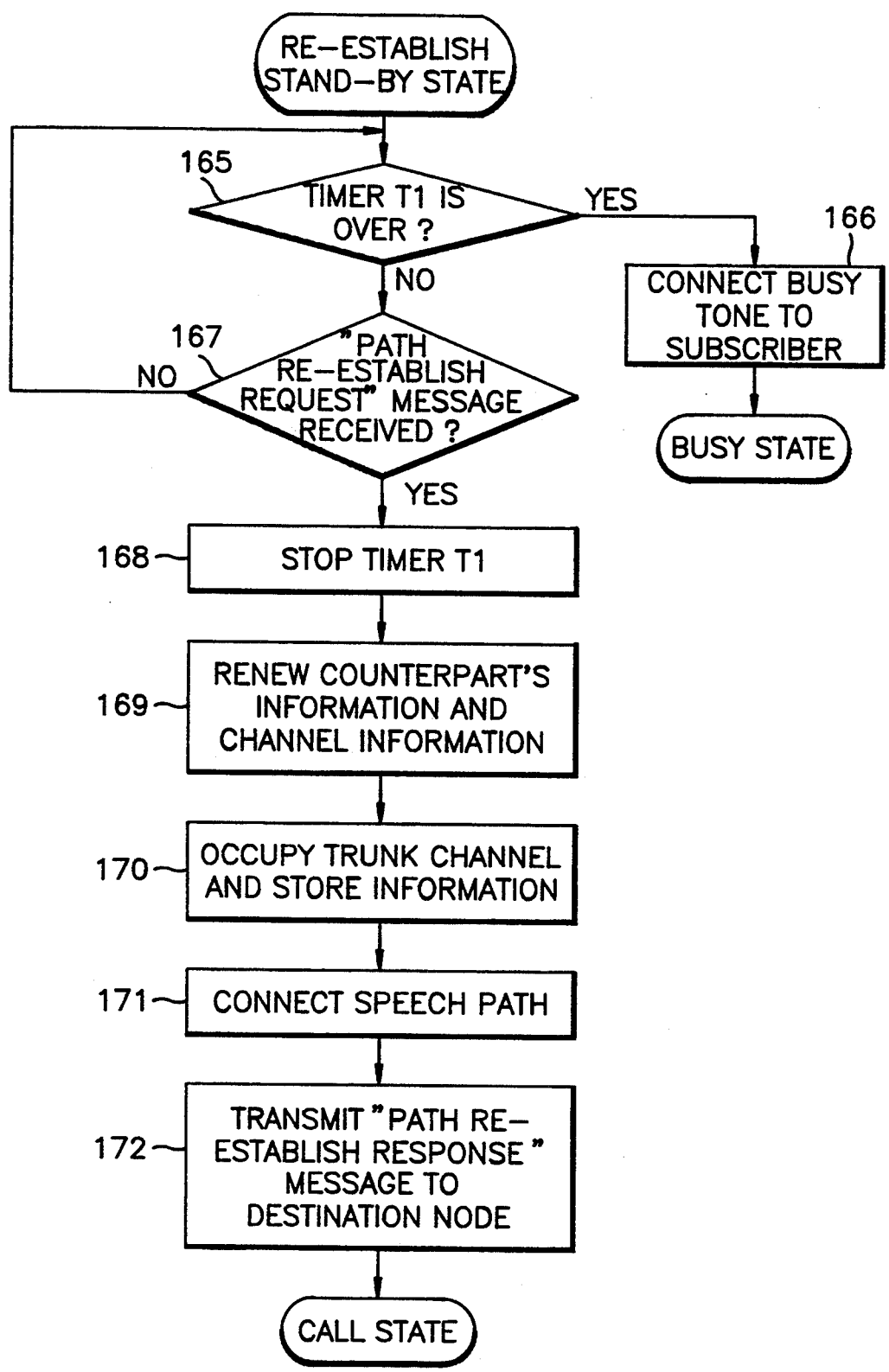
Figure 5D:
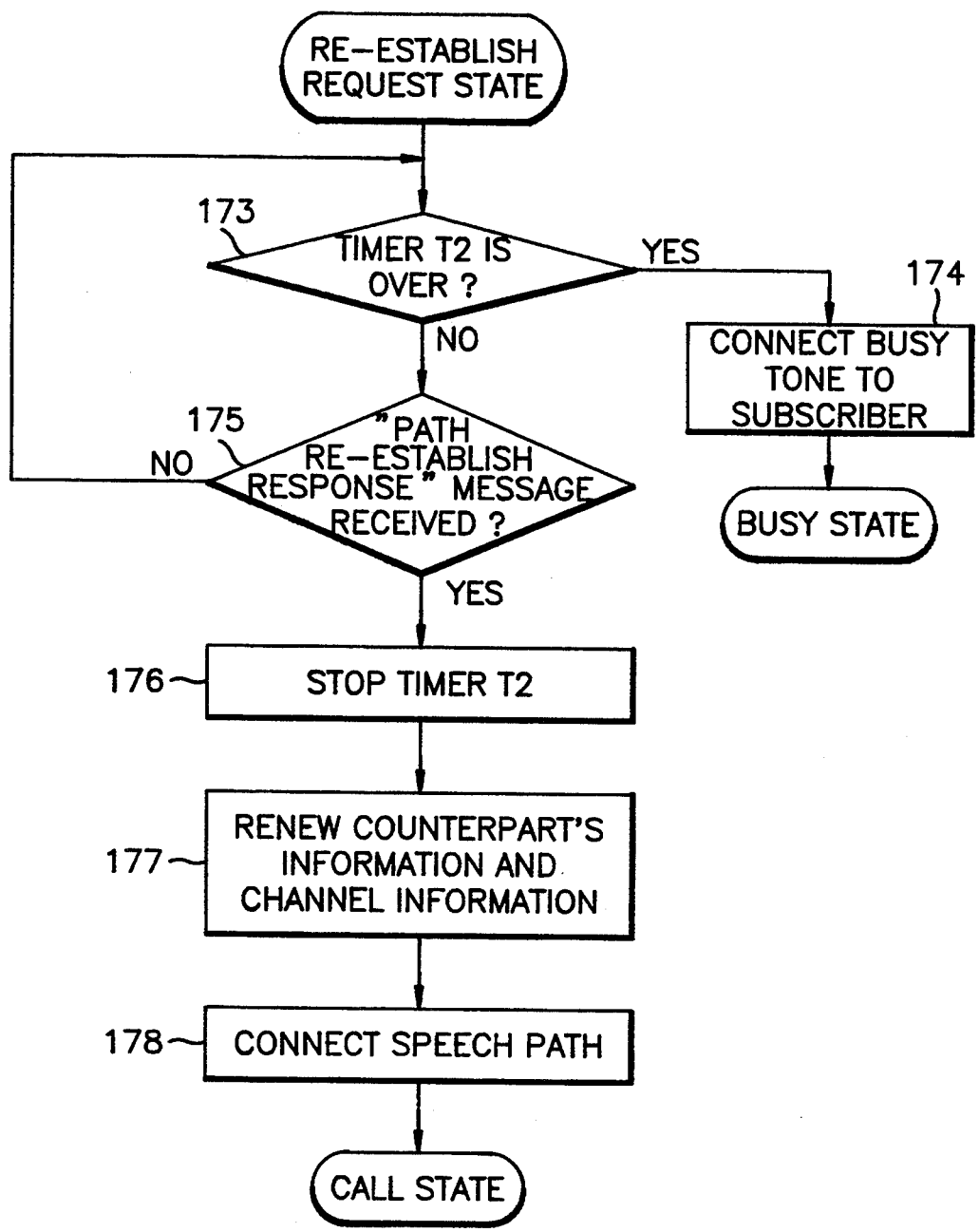
Figure 5E:
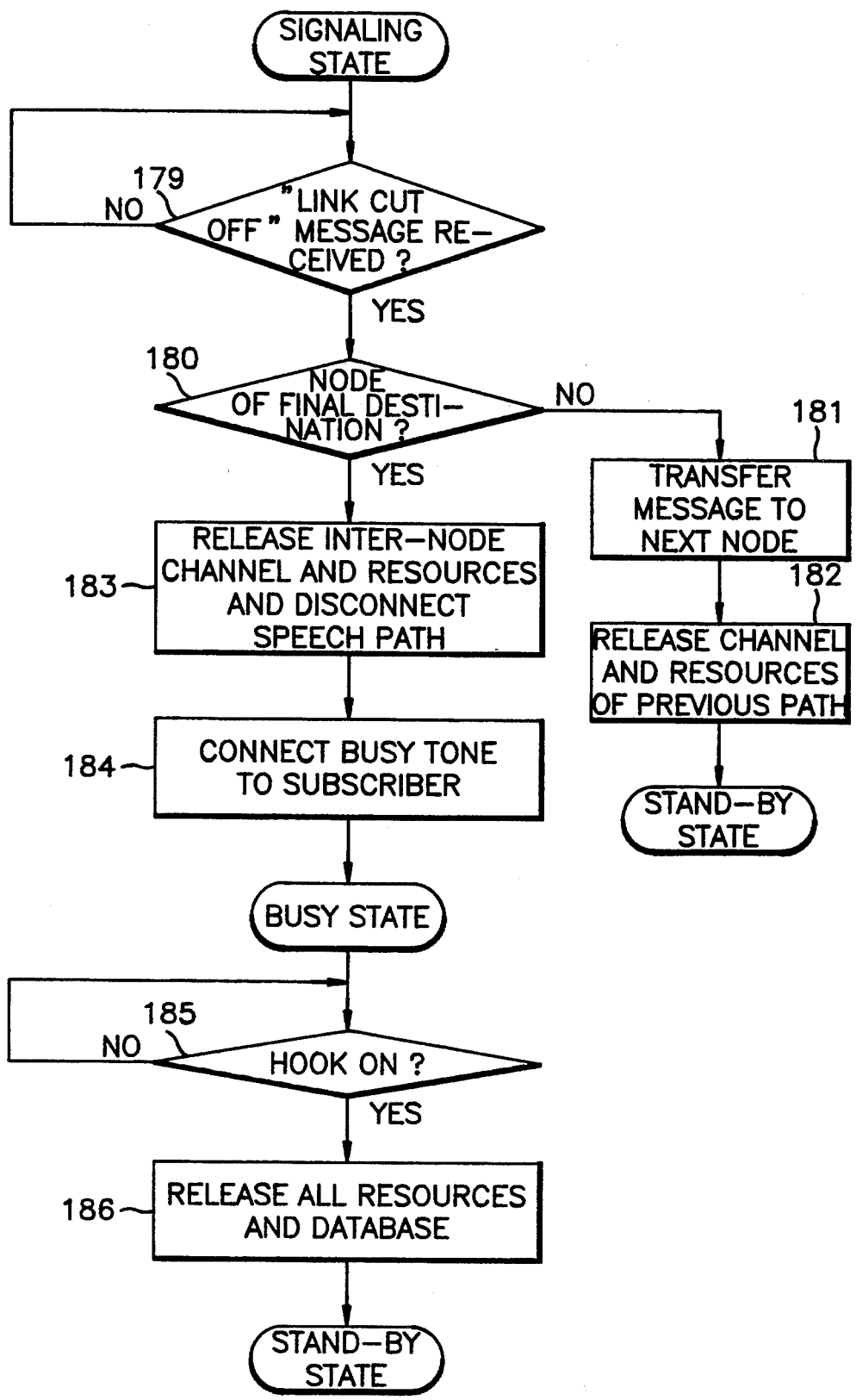

Referring to FIG. 4, in step 131, if a message of "link establish" is received from the trunk signaling circuit 70 of FIG. 2 and a link control program is performed, a routing table as shown in FIG. 3 is renewed in step 132. Step 132 is followed by step 133 to transmit a message of "new information" to an adjacent node. If the message of "new information" is received in step 141, a routing table is also renewed in step 142. Meanwhile, in step 134, if a message of "link cut off" is received, a routing table is renewed in step 135. Step 135 proceeds to step 136 to transmit a message of "new information" to an adjacent node. Next, in step 137, a subscriber who is signaling or speaking on the telephone through a disconnected link is searched for. Following step 137, in step 138, a determination is made as to whether or not a subscriber is speaking on the telephone. If the subscriber is speaking on the telephone, step 138 proceeds to step 139 to transmit a message of "path re-establish" to a call processor and if the subscriber is signaling on the telephone, step 138 advances to step 140 to transmit a message of "link cut off" to the subscriber.

Referring to FIGS. 5A to 5E, a call processor checks, in step 150, whether a subscriber is speaking on the telephone or not and if the subscriber is not speaking on the telephone, step 150 is entered into a stand-by state. When the subscriber is speaking on the telephone, a determination judgement is made as to whether or not a message of "path re-establish" has been received in step 151. If the message is not received, program loops in step 151 until the message is received, and if the message is received, step 151 goes to step 152 to see if a corresponding node is a final destination of the message. When the corresponding node is not a final destination, that is, if it is an intermediate node, step 152 advances to step 153 where the message is transmitted to a next node. This is followed by step 154 to release a channel and resources relating to a previously established speech path. Next, program proceeds to a stand-by state.

On the other hand, if the corresponding node is a final destination of the message, step 152 is succeeded by step 155 to see if a presently performing call is an originating call. In this case, the originating call is determined by checking a call control block. Since the disconnection of a link is almost simultaneously sensed at two nodes connected thereto, a message of "path re-establish" is transmitted to originating and called party modules. In step 155, if the presently performing call is not an originating call, program advances to step 156 to release a channel between nodes and related resources and disconnect a speech path. In following step 157, a timer T1 for measuring a maximum standby time waiting for a message from the subscriber of the originating party is operated and program goes to a re-establish standby state. In step 155, if the presently performing call is an originating call, program is followed by step 158 to release a channel between nodes and related resources and disconnect a speech path. Subsequently, in step 159, a determination is made as to whether or not a replaceable path for proceeding to a destination node exists. If there is no a replaceable path, step 159 goes to step 160 to connect busy tone to a subscriber and advances to a busy state. If a replaceable path exists, step 159 advances to step 161 to search for a replaceable path except for a previously established path. This is followed by step 162 to search for a trunk channel and related information necessary for a call process between nodes. Next, a message of "path re-establishment request" is transmitted to a destination node, in step 163. In step 164 following step 163, a timer T2 for measuring a maximum standby time waiting for a message from the subscriber of the called party is operated. Thus, program goes to a re-establish request state.

Meanwhile, under the re-establish standby state of the subscriber of the called party, program checks, in step 165, whether a maximum standby time of the timer T1 is over or not. When the maximum standby time is over, step 165 is succeeded by step 166 where busy tone is connected to a subscriber since there is no a replaceable path with an originating party and entered into a busy state. If the maximum standby time is not over, step 165 is followed by step 167 to see if a message of "path re-establish request" has been received. If the message has been received, step 167 advances to step 168 to stop the timer T1, and otherwise, step 167 returns back to step 165. In step 169 following step 168, counterpart's information and channel information is renewed from a received message. In step 170, a trunk channel is occupied and related information is stored. Step 170 is succeeded by step 171 where a speech path is connected, and a message of "path re-establish response" is transmitted to a destination node, in step 172. Next, program proceeds to a call state.

Under the re-establish request state of the subscriber of the originating party waiting for counterpart's response, program checks, in step 173, whether a maximum standby time of the timer T2 is over or not. If the maximum standby time is over, since this is regraded as failure of a node of the called party, a telephone call is difficult even though there is a replaceable path. Thus, step 173 advances to step 174 where busy tone is connected to a subscriber and entered into a busy state. If the maximum standby time is not over, step 173 is followed by step 175 to see if a message of "path re-establish response" has been received. In step 175, if the message has been received from the subscriber of the called party, program advances to step 176 to stop the timer T2, and otherwise, step 175 returns back to step 173. In step 177 following step 176, counterpart's information and channel information is renewed from a received message. Following this, in step 178, a speech path is connected and program proceeds to a call state.

Under the signaling state, program checks, in step 179, whether or not a message of "link cut off" has been received. If the message has been received, step 179 is followed by step 180. Otherwise, program loops in step 179 until the message is received. In step 180, a determination is made as to whether or not a corresponding node is a final destination of the message. If the corresponding node is not a final destination, that is, if it is an intermediate node, step 180 advances to step 181 where the message is transmitted to a next node. This is followed by step 182 to release a channel and resources relating to a previously established speech path. Next, program proceeds to a standby state. On the other hand, in step 180, if the corresponding node is a final destination of the message, since the re-establishment of a signaling call is considerably complicate even though there is a replaceable path, program is succeeded by step 183 to release a channel between nodes and related resources and disconnect a speech path. In following step 184, a busy tone is connected to a subscriber. Subsequently, program advances to a busy state. Under the busy state, program proceeds to step 185 to see if the telephone of a subscriber is a hook-on state. If the telephone of the subscriber is a hook-on state, program proceeds to step 186 to release all resources and database necessary for call establishment, and otherwise, program loops in step 185. Step 186 is followed by a stand-by state.

As described above, when a link between nodes is cut off in a decentralized switching network, by re-establishing a call of a subscriber speaking on the telephone, the reliability of a system is improved and enhanced service is provided to the subscriber. That is, in most switching network, since a state of a link connecting a node is considerably unstable, and after a link is suddenly cut off, the re-connection is frequent, by applying the above-described example of a method of a call process to the switching network, a reliable system can be obtained.

While preferred embodiments of the present invention have been particularly shown and described, it will be understood by those skilled in the art that foregoing and other changes in form and details may be made without departing from the spirit and scope of the present invention.

What is claimed is:

1. A method for managing a speech path link in a switching system, comprising the steps of:
   renewing a routing table and transferring a new information message to an adjacent node when a link establish message is received;
   renewing the routing table, transferring said new information message to the adjacent node and using said routing table to search for a communicating subscriber using a disconnected link when a link cut-off message is received; and
   transmitting a path re-establish message to a call processor when said subscriber is speaking on a telephone, and transmitting the link cut-off message to said subscriber when said subscriber is not speaking on the telephone.

2. A method for re-connecting a link of a speech path for a subscriber speaking on a telephone in a switching system, comprising the steps of:
   checking whether a node is a final destination node when a path re-establish message is received,
   transmitting said path re-establish message to a next node and releasing an inter-node channel and related information of a speech path when said node is not said final destination node;

checking whether said node is an originating call node or a receiving call node when said node is said final destination node, releasing the inter-node channel and related information, disconnecting said speech path, operating a first timer to measure a first maximum standby time for waiting for a path re-establish request message from said originating call node, and proceeding to a re-establish standby state when said node is said receiving call node;

releasing the inter-node channel and related information, disconnecting said speech path and checking whether a replaceable speech path for proceeding to said receiving call node exists when said node is said originating call node, connecting a busy tone to said originating call node and proceeding to a busy state when no replaceable speech path for proceeding to said receiving call node exists;

searching for said replaceable speech path, occupying a trunk channel, storing information necessary for a call process, transmitting a path re-establish request message to said receiving call node, and operating a second timer to measure a second maximum standby time for waiting for a path re-establish response message from said receiving call node when said replaceable speech path for proceeding to said receiving call node exists;

under said re-establish standby state, checking whether said first maximum standby time is over, checking whether the path re-establish request message is received before said first maximum standby time is over, and connecting the busy tone to said receiving call node when said first maximum standby time is over;

stopping said first timer for measuring said first maximum standby time, renewing a counterpart's information and channel information, occupying said trunk channel and storing information, connecting the speech path, and transmitting said path re-establish response message to said originating call node when said path re-establish request message is received from said originating call node within said first maximum standby time; and checking whether said second maximum standby time is over, checking whether said path re-establish response message before said second maximum standby time is over, and connecting said busy tone to said originating call node when said second maximum standby time is over, stopping said second timer for measuring said second maximum standby time, renewing the counterpart's information and channel information, and connecting the speech path when said path re-establish response message is received from said receiving call node within said second maximum standby time.

3. The method as claimed in claim 2, further comprised of establishing a signaling state, said signaling state comprising the steps of:

determining when a link cut off message has been received;

determining whether said node is said final destination node of said link cut off message after said link cut off message is received;

transmitting said link cut off message to said next node and releasing said inter-node channel relating to said speech path if it is determined that said node is not said final destination node; and releasing said inter-node channel, disconnecting said previous speech path, connecting said busy tone to said node and proceeding to said busy state if it is determined that said node is said final destination node.

4. The method as claimed in claim 3, further comprised of establishing the busy state, said busy state comprising the steps of:

determining whether the telephone of said subscriber is in a hook-on state; and releasing all resources and database necessary for call establishment when it is determined that the telephone of said subscriber is in the hook-on state.

5. A method for managing a speech path link in a switching system, comprising the steps of:

determining whether a link establish message is received;

renewing a routing table and transmitting a new information message to an adjacent node if it is determined that said link establish message is received;

determining whether a link cut off message is received;

renewing said routing table, transmitting said new information message to said adjacent node, searching for a subscriber using a disconnected link, and determining whether said subscriber is speaking on a telephone if it is determined that said link cut off message is received;

transmitting a link cut off message to said subscriber if it is determined that said subscriber is not speaking on said telephone; and transmitting a path re-establish message to a call processor if it is determined that: said subscriber is speaking on said telephone.

6. An apparatus for managing a speech path link in a switching system, comprising:

a central processing unit;

a switching circuit controlled by said central processing unit; and a trunk signaling circuit;

said central processing unit renewing a routing table when a link establish message is received, said speech path link comprising a plurality of nodes interconnected by a plurality of links;

said trunk signaling circuit transferring a new information message to an adjacent node using said routing table;

said central processing unit renewing the routing table and said trunk signaling circuit transferring said new information message to the adjacent node when a link-cut-off message is received, said switching circuit using said routing table to search for a subscriber using a disconnected link, transmitting a path re-establish message when said subscriber is speaking on a telephone, and transmitting the link-cut-off message to said subscriber when said subscriber is not speaking on the telephone.

7. An apparatus for re-connecting a link of a speech path for a subscriber speaking on a telephone in a switching system comprising:

a central processing unit;

a switching circuit controlled by said central processing unit; and a trunk signaling circuit;

said switching circuit checking whether a node is a final destination node when a path re-establish message is received, said trunk signaling circuit transmitting said path re-establish message to a next node and said switching circuit releasing an inter-node channel and related information of a speech path when said node is not said final destination node;

said switching circuit checking whether said node is an originating call node or a receiving call node when said node is said final destination node, said switching circuit releasing the inter-node channel and related information, disconnecting said speech path, operating a first timer to measure a first maximum standby time for waiting for a path re-establish request message from said originating call node, and proceeding to a re-establish standby state when said node is said receiving call node;

said switching circuit releasing the inter-node channel and related information, disconnecting said speech path, and checking whether a replaceable speech path for proceeding to said receiving call node exists when said node is said originating call node, said switching circuit connecting a busy tone to said originating call node when there is no replaceable speech path;

said switching circuit searching for said replaceable speech path, occupying a trunk channel and storing information necessary for a call process, said trunk signaling circuit transmitting a path re-establish request message to said receiving call node, and said switching circuit operating a second timer to measure a second maximum standby time for waiting for a path re-establish response message from said receiving call node when said replaceable speech path exists;

under a re-establish standby state, said switching circuit checks whether said first maximum standby time is over, checks whether the path re-establish request message is received from said originating call node before said first maximum standby time is over, and connects said busy tone to said receiving call node when said first maximum standby time is over;

said switching circuit stops measurement of said first maximum standby time, renews a counterpart's information and channel information, occupies said trunk channel and stores information, connects the speech path, and said trunk signaling circuit transmits said path re-establish response message to said originating call node when said path re-establish request message is received from said originating call node before said first maximum standby time is over; and said switching circuit checks whether said second maximum standby time is over, checks whether the path re-establish response message is received from said receiving call node before said second maximum standby time is over, and connects said busy tone to said originating call node when said second maximum standby time is over, said switching circuit stops measurement of said second maximum standby time, renews said counterpart's information and channel information, and connects the speech path when said path re-establish response message is received from said receiving call node before said second maximum standby time is over.

8. A method for re-connecting a link of a speech path for a subscriber speaking on a telephone in a switching system, comprising the steps of:

determining whether a subscriber is speaking on a telephone;

remaining in a stand-by state until it is determined that said subscriber is speaking on the telephone;

determining whether a path re-establish message has been received once it is determined that said subscriber is speaking on the telephone;

determining whether a corresponding node is a final destination node once it is determined that said path re-establish message has been received;

transferring said path re-establish message to a next node, releasing an inter-node channel and resources of a speech path, and entering said stand-by state if it is determined that the corresponding node is not the final destination node;

determining whether said corresponding node is an originating call node or a receiving call node if it is determined that the corresponding node is the final destination node;

releasing the inter-node channel and resources, disconnecting a speech path, operating a first timer for measuring a first maximum standby time for waiting for a path re-establish request message from said originating call node, and proceeding to a re-establish standby state when the corresponding node is said receiving call node:

releasing the inter-node channel and resources, disconnecting the speech path, and determining whether a replaceable speech path for proceeding to the receiving call node exists if it is determined that the corresponding node is said originating call node;

connecting a busy tone to said originating call node and entering a busy state if it is determined that no replaceable speech path for proceeding to the receiving call node exists;

searching for the replaceable speech path, trunk channel and related information, transmitting said path re-establish request message to the receiving call node, operating a second timer for measuring a second maximum standby time for waiting for a path re-establish response message from said receiving call node, and proceeding to a re-establish request state if it is determined that the replaceable speech path for proceeding to the receiving call node exists.

9. The method as claimed in claim 8, wherein said re-establish standby state comprises the steps of:

determining whether said first maximum standby time measured by said first timer has expired, connecting said busy tone to said receiving call node when said first maximum standby time has expired, and determining whether said path re-establish request message has been received from said originating call node before said first maximum standby time has expired;

stopping said first timer, renewing said counterpart's information and channel information, occupying said trunk channel and storing information, connecting said speech path, and transmitting said path re-establish response message to said originating call node when said path re-establish request message has been received from said originating call node before said first maximum standby time has expired.

10. The method as claimed in claim 8, further comprising a re-establish request state, said re-establish request state comprising the steps of:
    determining whether said second maximum standby time measured by said second timer has expired, connecting said busy tone to said originating call node when said second maximum standby time has expired, and determining whether said path re-establish response message has been received from said receiving call node before said second maximum standby time has expired;
    stopping said second timer, renewing said counterpart's information and channel information, and connecting said speech path when said path re-establish response message has been received from said receiving call node before said second maximum standby time has expired.

11. The method as claimed in claim 8, further comprising a signaling state, said signaling state comprising the steps of:
    determining when a link cut off message has been received;
    determining whether said corresponding node is said final destination node of said link cut off message after said link cut off message is received;
    transmitting said link cut off message to said next node and releasing said inter-node channel relating to said speech path if it is determined that said corresponding node is not said final destination node of said link cut off message; and
    releasing said inter-node channel, disconnecting said speech path, connecting said busy tone to said corresponding node and proceeding to said busy state if it is determined that said corresponding node is said final destination node of said link cut off message.

12. The method as claimed in claim 11, further comprised of establishing said busy state, said busy state comprising the steps of:
    determining whether the telephone of said subscriber is in a hook-on state; and
    releasing all resources and database necessary for call establishment when it is determined that the telephone of said subscriber is in said hook-on state.

13. An apparatus for re-connecting a link of a speech path for a subscriber speaking on a telephone in a switching system comprising:
    a central processing unit;
    a switching circuit controlled by said central processing unit; and
    a trunk signaling circuit;
    said switching circuit for determining whether a subscriber is speaking on the telephone;
    said switching system remaining in a stand-by state until it is determined that said subscriber is speaking on the telephone;
    said switching circuit determining whether a path re-establish message has been received if it is determined that said subscriber is speaking on the telephone and said switching circuit further determining whether a corresponding node is a final destination node if it is determined that said path re-establish message has been received;
    said trunk signaling circuit transferring said path re-establish message to a next node, said switching circuit releasing an inter-node channel and resources of a speech path and said switching system entering said stand-by state if it is determined that the corresponding node is not the final destination node;
    said switching circuit determining whether said corresponding node is an originating call node or a receiving call node if it is determined that the corresponding node is the final destination node,
    said switching circuit releasing the inter-node channel and resources, disconnecting a speech path, and measuring a first maximum standby time for waiting for a path re-establish request message from said originating call node and said switching system proceeding to a re-establish standby state when the corresponding node is said receiving call node;
    said switching circuit releasing the inter-node channel and resources, disconnecting the speech path and determining whether a replaceable speech path for proceeding to the receiving call node exists if it is determined that the corresponding node is said originating call node,
    said switching circuit connecting a busy tone to said originating call node and said switching system entering a busy state if it is determined that no replaceable speech path for proceeding to the receiving call node exists;
    said switching circuit searching for the replaceable speech path, trunk channel and related information, said trunk signaling circuit transmitting said path re-establish request message to the receiving call node, said switching circuit measuring a second maximum standby time for waiting for a path re-establish response message from said receiving call node and said switching system proceeding to a re-establish request state if it is determined that the replaceable speech path for proceeding to the receiving call node exists.

14. The apparatus as claimed in claim 13, wherein said re-establish standby state is established by said switching circuit determining whether said first maximum standby time has expired, connecting said busy tone to said receiving call node when said first maximum standby time has expired, and determining whether said path re-establish request message has been received from said originating call node before said first maximum standby time has expired;
    said switching circuit stopping measurement of said first maximum standby time, renewing said counterpart's information and channel information, occupying said trunk channel and storing information, connecting said speech path, and said trunk signaling circuit transmitting said path re-establish response message to said originating call node when said path re-establish request message has been received from said originating call node before said first maximum standby time has expired.

15. The apparatus as claimed in claim 13, wherein said re-establish request state is established by said switching circuit determining whether said second maximum standby time has expired, connecting said busy tone to said originating call node when said second maximum standby time has expired, and determining whether said path re-establish response message has been received from said receiving call node before said second maximum standby time has expired;
    said switching circuit stopping measurement of said second maximum standby time, renewing said counterpart's information and channel information, and connecting said speech path when said path re-establish response message has been received from said receiving call node before said second maximum standby time has expired.

16. The apparatus as claimed in claim 13, wherein said switching system proceeds to a signaling state by said switching circuit determining when a link cut off message has been received and determining whether said corresponding node is said final destination node of said link cut off message after said link cut off message is received;

said trunk signaling circuit transmitting said link cut off message to said next node and said switching circuit releasing said inter-node channel relating to said speech path if it is determined that said corresponding node is not said final destination node of said link cut off message;

said switching circuit releasing said inter-node channel, disconnecting said speech path, and connecting said busy tone to said corresponding node and entering said busy state if it is determined that said corresponding node is said final destination node of said link cut off message.

17. The apparatus as claimed in claim 16, wherein said switching system proceeds from said busy state by said switching circuit determining whether the telephone of said subscriber is in a hook-on state and releasing all resources and database necessary for call establishment when it is determined that the telephone of said subscriber is in said hook-on state.

* * * * *

UNITED STATES PATENT AND TRADEMARK OFFICE
CERTIFICATE OF CORRECTION

PATENT NO. : 5,345,503
DATED : 6 September 1994
INVENTOR(S) : Seong- Geun Lee

It is certified that error appears in the above-indentified patent and that said Letters Patent is hereby corrected as shown below:

Column 2,

Line 49    Delete "judgement";

IN THE CLAIMS

Column 5,

Line 48    after "message" insert --is received--:

Signed and Sealed this

Fifteenth Day of October, 1996

Attest:

BRUCE LEHMAN

*Attesting Officer*    *Commissioner of Patents and Trademarks*